(12) United States Patent
Cochran et al.

(10) Patent No.: US 10,074,057 B2
(45) Date of Patent: Sep. 11, 2018

(54) GRAPHICAL RE-INSPECTION USER SETUP INTERFACE

(75) Inventors: Don W. Cochran, Novelty, OH (US); Fredrick F. Awig, II, Lyndhurst, OH (US); Kevin E. Batty, Akron, OH (US); Jesse C. Booher, Solon, OH (US); David W. Cochran, Lyndhurst, OH (US); Patrick Gilliland, Burton, OH (US); Noel E. Morgan, Jr., North Olmsted, OH (US); Thomas H. Palombo, Cuyahoga Falls, OH (US); Timothy SirLouis, Medina, OH (US); Michael L. Yoder, Wadsworth, OH (US)

(73) Assignee: Pressco Technology Inc., Cleveland, OH (US)

( * ) Notice: Subject to any disclaimer, the term of this patent is extended or adjusted under 35 U.S.C. 154(b) by 203 days.

(21) Appl. No.: 11/134,137

(22) Filed: May 20, 2005

(65) Prior Publication Data
US 2005/0273720 A1 Dec. 8, 2005

Related U.S. Application Data

(60) Provisional application No. 60/573,496, filed on May 21, 2004.

(51) Int. Cl.
*G06F 3/00* (2006.01)
*G06Q 10/06* (2012.01)
*G05B 19/418* (2006.01)

(52) U.S. Cl.
CPC ....... *G06Q 10/06* (2013.01); *G05B 19/41875* (2013.01); *G05B 2219/31472* (2013.01); *Y02P 90/22* (2015.11); *Y02P 90/86* (2015.11)

(58) Field of Classification Search
CPC .................................. G06F 3/0481–3/0489
(Continued)

(56) References Cited

U.S. PATENT DOCUMENTS

| 3,309,553 A | 3/1967 | Kroemer |
| 4,163,238 A | 7/1979 | Esaki et al. |

(Continued)

FOREIGN PATENT DOCUMENTS

| CN | 1191461 A | 8/1998 |
| CN | 1199970 A | 11/1998 |

(Continued)

OTHER PUBLICATIONS

International Search Report and Written Opinion for PCT/US05/17672.
(Continued)

*Primary Examiner* — Steven B Theriault
(74) *Attorney, Agent, or Firm* — Fay Sharpe LLP

(57) ABSTRACT

The invention provides for a graphical user interface which provides for very simple and intuitive ways of changing single or multiple inspection parameters. The graphical display immediately shows what the monitoring or inspection result would have been if the effected change had been in place during the inspection of the last "N" parts. This retrospective graphical "look-back" invokes immediate re-inspection facilitating an estimation of what the future inspection or process monitoring results will be if future production looks similar to the recent past production. The re-inspection results are immediately shown with a combination of visualization for ease of understanding and settings optimization. The visualization also shows selected other associated data to each specific inspection for ease of tracking and optimizing production processes.

45 Claims, 5 Drawing Sheets

(58) Field of Classification Search
USPC ......... 715/764, 751, 736, 866; 382/141, 149
See application file for complete search history.

(56) References Cited

U.S. PATENT DOCUMENTS

| | | | |
|---|---|---|---|
| 4,374,459 A | 2/1983 | Burton | |
| 4,378,494 A | 3/1983 | Miller | |
| 4,378,495 A | 3/1983 | Miller | |
| 4,421,978 A | 12/1983 | Laurer et al. | |
| 4,467,350 A | 8/1984 | Miller | |
| 4,502,121 A | 2/1985 | Clavier et al. | |
| 4,527,241 A | 7/1985 | Sheehan et al. | |
| 4,553,853 A | 11/1985 | Gregory et al. | |
| 4,567,670 A | 2/1986 | Roulstone | |
| 4,607,705 A | 8/1986 | Tebben | |
| 4,650,005 A | 3/1987 | Tebben | |
| 4,689,810 A | 8/1987 | Devine, Jr. | |
| 4,744,707 A | 5/1988 | Negri et al. | |
| 4,754,200 A | 6/1988 | Plumb et al. | |
| 4,788,569 A | 11/1988 | Yamada et al. | |
| 4,796,343 A | 1/1989 | Wing | |
| 4,814,813 A | 3/1989 | Yamamoto et al. | |
| 4,829,380 A | 5/1989 | Iadipaolo | |
| 4,835,622 A | 5/1989 | Martins | |
| 4,841,318 A | 6/1989 | Yamamoto et al. | |
| 4,848,159 A | 7/1989 | Kennedy et al. | |
| 4,868,750 A | 9/1989 | Kucera et al. | |
| 4,877,683 A | 10/1989 | Bragaw et al. | |
| 4,900,010 A | 2/1990 | Wengmann et al. | |
| 4,956,656 A | 9/1990 | Yamamoto et al. | |
| 4,959,679 A | 9/1990 | Yamamoto et al. | |
| 4,963,036 A | 10/1990 | Drisko et al. | |
| 4,967,217 A | 10/1990 | Yamamoto et al. | |
| 4,988,540 A | 1/1991 | Bragaw et al. | |
| 4,990,944 A | 2/1991 | Yamamoto et al. | |
| 5,086,385 A | 2/1992 | Launey et al. | |
| 5,113,869 A | 5/1992 | Nappholz et al. | |
| 5,166,902 A | 11/1992 | Silver | |
| 5,205,178 A | 4/1993 | Odernheimer | |
| 5,216,925 A | 6/1993 | Odernheimer | |
| 5,226,118 A | 7/1993 | Baker et al. | |
| 5,270,764 A | 12/1993 | Ichihara | |
| 5,293,324 A * | 3/1994 | Tokura | G01N 21/95684 382/141 |
| 5,321,629 A | 6/1994 | Shirata et al. | |
| 5,355,163 A | 10/1994 | Tomitaka | |
| 5,365,292 A | 11/1994 | Wakabayashi et al. | |
| 5,408,488 A | 4/1995 | Kurihara et al. | |
| 5,454,049 A | 9/1995 | Oki et al. | |
| 5,479,259 A | 12/1995 | Nakata et al. | |
| 5,481,712 A | 1/1996 | Silver et al. | |
| 5,495,567 A | 2/1996 | Iizawa et al. | |
| 5,550,763 A | 8/1996 | Michael et al. | |
| 5,581,632 A | 12/1996 | Koljonen et al. | |
| 5,602,606 A | 2/1997 | Yazawa | |
| 5,642,158 A | 6/1997 | Petry et al. | |
| 5,659,624 A * | 8/1997 | Fazzari | B07C 5/3422 209/580 |
| 5,659,829 A | 8/1997 | Yamamoto et al. | |
| 5,663,833 A | 9/1997 | Nanba et al. | |
| 5,676,302 A | 10/1997 | Petry | |
| 5,680,305 A | 10/1997 | Apgar | |
| 5,728,168 A | 3/1998 | Laghi et al. | |
| 5,742,504 A | 4/1998 | Meyer et al. | |
| 5,761,064 A * | 6/1998 | La et al. | 700/110 |
| 5,781,243 A | 7/1998 | Kormos | |
| 5,781,294 A | 7/1998 | Nakata et al. | |
| 5,796,868 A | 8/1998 | Dutta | |
| 5,806,080 A | 9/1998 | Purple et al. | |
| 5,815,411 A | 9/1998 | Ellenby et al. | |
| 5,831,638 A | 11/1998 | West et al. | |
| 5,835,622 A | 11/1998 | Koljonen et al. | |
| 5,841,434 A | 11/1998 | Arda et al. | |
| 5,884,229 A | 3/1999 | Matteucci | |
| 5,901,241 A | 5/1999 | Koljonen et al. | |
| 5,903,459 A | 5/1999 | Greenwood et al. | |
| 5,909,372 A | 6/1999 | Thybo | |
| 5,920,483 A | 7/1999 | Greenwood et al. | |
| 5,936,553 A | 8/1999 | Kabel | |
| 5,940,296 A | 8/1999 | Meyer | |
| 5,949,685 A | 9/1999 | Greenwood et al. | |
| 5,953,356 A | 9/1999 | Botez et al. | |
| 5,963,918 A | 10/1999 | Reagan et al. | |
| 5,978,502 A * | 11/1999 | Ohashi | G06K 9/00201 348/126 |
| 5,985,203 A | 11/1999 | Bowkett | |
| 5,987,517 A | 11/1999 | Firth et al. | |
| 6,007,201 A | 12/1999 | Wada et al. | |
| 6,008,945 A | 12/1999 | Fergason | |
| 6,012,088 A | 1/2000 | Li et al. | |
| 6,016,562 A * | 1/2000 | Miyazaki | G01R 31/01 257/E21.53 |
| 6,037,936 A | 3/2000 | Ellenby et al. | |
| 6,041,269 A | 3/2000 | Tain | |
| 6,052,631 A | 4/2000 | Busch et al. | |
| 6,061,467 A | 5/2000 | Michael | |
| 6,064,759 A * | 5/2000 | Buckley | G01B 11/024 348/125 |
| 6,072,511 A | 6/2000 | Mueller et al. | |
| 6,081,670 A | 6/2000 | Madsen et al. | |
| 6,112,172 A * | 8/2000 | True | G06F 17/30017 704/235 |
| 6,115,042 A | 9/2000 | Li et al. | |
| 6,123,605 A | 9/2000 | Yano | |
| 6,151,452 A | 11/2000 | Ping | |
| 6,157,374 A | 12/2000 | West et al. | |
| 6,175,644 B1 * | 1/2001 | Scola | G01N 21/8851 117/201 |
| 6,221,592 B1 | 4/2001 | Schwartz et al. | |
| 6,224,549 B1 | 5/2001 | Van Drongelen | |
| 6,229,515 B1 | 5/2001 | Itoh et al. | |
| 6,243,848 B1 | 6/2001 | Guiget et al. | |
| 6,247,481 B1 | 6/2001 | Meuris et al. | |
| 6,264,591 B1 | 7/2001 | Keen et al. | |
| 6,273,420 B1 | 8/2001 | Brooks | |
| 6,298,474 B1 * | 10/2001 | Blowers | G06F 8/34 700/83 |
| 6,315,660 B1 | 11/2001 | Demar et al. | |
| 6,334,165 B1 | 12/2001 | Barenys et al. | |
| 6,341,291 B1 | 1/2002 | Bentley et al. | |
| 6,356,859 B1 * | 3/2002 | Talbot | G06F 11/3414 702/119 |
| 6,366,690 B1 | 4/2002 | Smilansky et al. | |
| 6,373,618 B1 | 4/2002 | Agrawal et al. | |
| 6,374,335 B1 | 4/2002 | Barthel et al. | |
| 6,397,131 B1 | 5/2002 | Busch et al. | |
| 6,414,696 B1 | 7/2002 | Ellenby et al. | |
| 6,445,199 B1 * | 9/2002 | Satya et al. | 324/753 |
| 6,477,266 B1 * | 11/2002 | Asar | G01N 21/95607 382/144 |
| 6,482,089 B2 | 11/2002 | DeMar et al. | |
| 6,482,185 B1 | 11/2002 | Hartmann | |
| 6,490,600 B1 | 12/2002 | McGarry | |
| 6,506,117 B2 | 1/2003 | DeMar et al. | |
| 6,507,042 B1 | 1/2003 | Mukai et al. | |
| 6,508,707 B2 | 1/2003 | DeMar et al. | |
| 6,520,855 B2 | 2/2003 | DeMar et al. | |
| 6,522,939 B1 | 2/2003 | Strauch et al. | |
| 6,530,385 B2 | 3/2003 | Meuris et al. | |
| 6,531,675 B2 * | 3/2003 | Faitel | B23K 26/02 219/121.63 |
| 6,536,553 B1 | 3/2003 | Scanlon | |
| 6,571,133 B1 * | 5/2003 | Mandl | G05B 19/4147 700/11 |
| 6,593,045 B2 | 7/2003 | Sato et al. | |
| 6,593,856 B1 | 7/2003 | Madau | |
| 6,597,381 B1 * | 7/2003 | Eskridge | G06F 3/0481 382/145 |
| 6,607,888 B2 | 8/2003 | Schwartz et al. | |
| 6,611,728 B1 * | 8/2003 | Morioka | G01N 21/9501 257/E21.525 |
| 6,636,818 B1 | 10/2003 | Lawrence | |
| 6,651,034 B1 | 11/2003 | Hedlund et al. | |

(56) References Cited

U.S. PATENT DOCUMENTS

| | | |
|---|---|---|
| 6,664,499 B1 | 12/2003 | Brink et al. |
| 6,674,561 B2 | 1/2004 | Ohnishi et al. |
| 6,677,939 B2 | 1/2004 | Uchiyama |
| 6,681,145 B1 | 1/2004 | Greenwood et al. |
| 6,687,633 B2 | 2/2004 | Ono et al. |
| 6,693,518 B2 | 2/2004 | Kumata et al. |
| 6,744,266 B2* | 6/2004 | Dor .................. H01L 22/20 257/E21.525 |
| 6,757,645 B2* | 6/2004 | Chang ................. G03F 1/26 703/13 |
| 6,823,272 B2* | 11/2004 | Sutton ............ G01R 31/31912 700/121 |
| 6,876,898 B1* | 4/2005 | Hranica ............. G05B 19/128 700/114 |
| 6,952,653 B2* | 10/2005 | Toth ................. G01N 21/9501 382/149 |
| 6,959,251 B2* | 10/2005 | Coldren ........... G05B 19/41875 702/83 |
| 6,970,588 B1* | 11/2005 | Komatsu ............ G06K 9/6253 356/237.1 |
| 6,973,209 B2 | 12/2005 | Tanaka |
| 6,985,220 B1* | 1/2006 | Chen ............... G05B 19/41875 356/237.5 |
| 7,081,769 B2* | 7/2006 | Lee ..................... H01L 23/544 257/E23.179 |
| 7,095,893 B2* | 8/2006 | Reiners ................. G06K 9/42 348/129 |
| 7,103,505 B2* | 9/2006 | Teshima ................ H01J 37/28 700/121 |
| 7,162,073 B1* | 1/2007 | Akgul ............... G01N 21/8851 348/125 |
| 7,236,625 B2* | 6/2007 | Engelbart ............. B29C 70/54 250/306 |
| 7,239,737 B2* | 7/2007 | Luque ................. H01L 22/20 257/E21.525 |
| 7,330,581 B2* | 2/2008 | Ishikawa ............... G06T 7/001 382/145 |
| 7,359,544 B2* | 4/2008 | Gao ................... G06K 9/6253 382/145 |
| 7,514,949 B2* | 4/2009 | Kang ............... G01R 31/31718 324/762.05 |
| 7,633,307 B2* | 12/2009 | Whipple ........... G01R 31/2874 324/750.1 |
| 7,672,500 B2* | 3/2010 | Albeck ............ G05B 19/41875 382/141 |
| 7,738,693 B2* | 6/2010 | Luque ................. H01L 22/20 348/126 |
| 2002/0022894 A1 | 2/2002 | Eryurek et al. |
| 2002/0123864 A1 | 9/2002 | Eryurek et al. |
| 2002/0131633 A1* | 9/2002 | Zwick ................. G06T 7/0002 382/152 |
| 2002/0141632 A1* | 10/2002 | Engelbart ............ G06T 7/0004 382/141 |
| 2002/0181756 A1* | 12/2002 | Shibuya .............. G01N 21/956 382/145 |
| 2002/0186379 A1* | 12/2002 | Drake, Jr. ............ G01B 11/161 356/502 |
| 2003/0020904 A1* | 1/2003 | Uto et al. .................. 356/237.2 |
| 2003/0036866 A1* | 2/2003 | Nair ...................... G01N 21/95 702/81 |
| 2003/0038841 A1* | 2/2003 | Vazquez ............ G05B 19/0426 715/762 |
| 2003/0038932 A1* | 2/2003 | Wienecke .......... G01N 21/9501 356/237.2 |
| 2003/0043175 A1* | 3/2003 | Vazquez .................... G06F 8/10 715/700 |
| 2003/0107573 A1* | 6/2003 | Miller .................... G01R 13/02 345/440 |
| 2003/0109952 A1* | 6/2003 | Hosoya ................. G06T 7/0002 700/110 |
| 2003/0150908 A1* | 8/2003 | Pokorny ................. B23Q 35/12 235/375 |
| 2004/0054660 A1* | 3/2004 | McCormick ..... G05B 19/41875 |
| 2004/0064293 A1* | 4/2004 | Hamilton ............ G06F 11/3409 702/182 |
| 2004/0070753 A1* | 4/2004 | Sugihara et al. .......... 356/237.5 |
| 2004/0095410 A1* | 5/2004 | Miyashita .............. B41J 2/0451 347/19 |
| 2004/0133927 A1* | 7/2004 | Sternberg .......... G06F 17/30247 725/136 |
| 2004/0138934 A1* | 7/2004 | Johnson et al. ................... 705/7 |
| 2004/0143419 A1* | 7/2004 | Stark ...................... G06Q 10/06 702/188 |
| 2004/0164983 A1* | 8/2004 | Khozai ................. G06T 11/206 345/440 |
| 2004/0186603 A1* | 9/2004 | Sanford et al. .................. 700/95 |
| 2004/0197012 A1* | 10/2004 | Bourg, Jr. .......... G01N 21/8851 382/110 |
| 2004/0218806 A1* | 11/2004 | Miyamoto ........... G06K 9/6253 382/145 |
| 2004/0228515 A1* | 11/2004 | Okabe .................. G06T 7/0004 382/145 |
| 2004/0252128 A1* | 12/2004 | Hao ....................... G06Q 10/10 345/581 |
| 2005/0080769 A1* | 4/2005 | Gemmell .......... G06F 17/30991 |
| 2005/0213807 A1* | 9/2005 | Wasserman .................... 382/152 |
| 2005/0240545 A1* | 10/2005 | Schachtely et al. ............ 706/47 |
| 2005/0275831 A1* | 12/2005 | Silver .................. G06K 9/4609 356/237.1 |
| 2007/0198105 A1* | 8/2007 | Britton ............................ 700/51 |
| 2009/0043714 A1* | 2/2009 | Zhao ................ G06F 17/30536 706/11 |

FOREIGN PATENT DOCUMENTS

| | | |
|---|---|---|
| CN | 1412978 A | 4/2003 |
| CN | 1452212 A | 10/2003 |
| JP | 04-169849 A | 6/1992 |
| JP | 05-135068 A | 6/1993 |
| JP | 2003-109162 A | 4/2003 |
| WO | WO 2001/041068 A1 | 6/2001 |
| WO | WO 03/059738 A2 | 7/2003 |

OTHER PUBLICATIONS

"Power of Genie," www.Applied1.com, (May 20, 2004).
Thomas C. Eskridge, "Speeding populated board inspection: a new technology," Electronics Engineer, 3 pages, May 2000.
LabVIEW User Manual, National Instruments, Apr. 2003 Edition.

* cited by examiner

4:3 Aspect Ratio Image

Pixels in Whole Image:
- 640 x 480 = <u>307,200</u> pixels in the 4:3 aspect rectangle (101)

Pixels in Circular Center (with 20 pixels clearance tolerance)
- $\pi R^2 = \pi\, 230^2 =$ <u>166,190</u> pixels included in circle (102)

Pixels in the (ROI) Toroidal Ring: (Outside Dia. = 460 & Inside Dia. = 360)
- 460 pixel O.D. = pi $230^2$ = 166,190 pixels
- 360 pixel I.D. = 101,787 pi $180^2$ = 101,787 pixels
- $\pi\, 230^2 - \pi\, 180^2$ = 166,190 - 101,787 = <u>64,403</u> in ROI (103)

GRAPHICAL RE-INSPECTION USER SETUP INTERFACE

This application claims priority to and the benefit of U.S. Provisional Application Ser. No. 60/573,496, filed May 21, 2004, which application is incorporated herein by reference in its entirety.

FIELD OF INVENTION

The present invention relates to a methodology for setting up and optimizing an automated industrial imaging inspection or other types of inspection or process monitoring systems.

BACKGROUND OF THE INVENTION

Automated industrial inspection and process monitoring technologies have often presented a substantial set up and optimization challenge. In automated or semi-automated high production factory environments, automated inspection technologies may be incorporated to monitor a wide range of product or process attributes. Many requirements are highly definable such as dimensions, number and location of holes, shape, thread pitch, and the like. These quantitative values are more easily set with a-priori knowledge, prior to production. Other types of product or process attributes are much more subjective and often cannot be easily quantified, measured, or specified prior to starting production. These tend to be related to variations of the raw materials or the production process itself. A few examples might be the size of a dip in a sealant compound, the sound quality of a child's talking toy, blotchiness of a mat surface, or the blurriness of an image. There are thousands of examples of these subjective attributes that must be monitored in manufacturing environments on an on-going basis. While it is possible to quantize each of them in a laboratory, the on-line monitoring systems are often less sensitive and designed to be more practical to function at real time, on-line speeds. While there is typically some kind of written specification there is generally a substantial amount of judgmental subjectivity in the interpretation of the specification on the plant floor. It is not unusual for a plant manager and a quality control manager to have substantial disagreement as to the suitability for shipment of a particular batch of product.

The practicality of increasing revenue shipments will often win over the more idealistic requirement of shipping a more perfect product. Sometimes, the level of quality expectation is cultural and has its' direct effect on quality expectations in a particular region. Other times, it is dictated by the quality standards and expectations of the buyer. Still other times, the end consumer of the product will dictate the final level of quality as a function of what the market is willing to pay for the product. All of these different quality expectations combine with the inherent quality challenge of a particular process or raw material lead to a need to dictate the automated inspection or process monitoring levels in accordance with the current need.

There are many reasons why process monitoring or inspection quality levels may need to be modulated but it is well established that this need exists in hundreds of thousands of converting and manufacturing plants around the world. The subject invention is a graphical methodology to allow for a more user-friendly and more intuitive way of understanding and changing such parameters.

As the inspection or monitoring parameters are changed, an immediate question often becomes "what will the revenue effect be of such a change?" The change of a quality threshold will usually mean that a different quantity of product will be either scrapped or sent for rework or recycling. Therefore, this decision to make the change in the quality level has a direct financial impact. Whoever is responsible for making such change will usually want to have the most direct feedback possible of what kind of revenue or financial impact such change may make. The subject invention facilitates an immediate understanding or could provide data which will lead to a quick understanding of financial and other impact to such a change.

A purist might argue that improved quality level would pay for itself. To the extent that this is true, the subject invention facilitates a much better understanding of the subtleties of changing the settings and it makes the settings on the basis of a large population of product rather than on a few individual samples.

It is also possible to use the subject invention to close a range of different process loops in either a manual, semi-automatic, or automatic way. The invention can be interconnected with another machine so that the indicator values can be associated with specific machine data at time of manufacture of a specific product. The melding of a complete record of each part can facilitate closing the loop with closely coupled machines so that a process can be continually optimized. Ease of understanding the inspection process interrelationship by virtue of the graphical user interface can facilitate closing control loops with a high confidence level.

The subject invention is adaptable to a wide-range of different industrial inspection and process monitoring systems. An abbreviated list follows:

Gray scale machine vision inspection or process monitoring systems
  Color based machine vision inspection or process monitoring systems
  X-ray based machine vision inspection or process monitoring systems
  Thermal infra-red vision inspection or process monitoring system
  Integrated mass inspection or process monitoring systems
  Acoustic signature inspection or process monitoring systems
  Force or pressure signature inspection or monitoring systems
  Spectophotometric inspection or monitoring systems
  Ultrasonic imaging inspection or process monitoring systems
  Ultrasonic signature inspection or process monitoring systems
  Profilometer inspection or process monitoring systems
  Surface finish inspection or process monitoring systems
  Glossometers inspection or process monitoring systems
  Laser interferrometric inspection or process monitoring systems
  Dimensional inspection or process monitoring systems
  Scanning laser inspection or process monitoring systems
  Densitometer inspection or process monitoring systems
  Thermal signature inspection or process monitoring systems
  Pattern inspection or process monitoring systems The above list is a partial one and the system types are cited by way of example. It should be understood that the subject invention can function as a user interface "front end" for nearly any system which has adjustable parameters or thresholds, the results of which needs to be dynamically understood on a sizeable historical sample set while changing them.

SUMMARY OF THE INVENTION

A graphical user interface is provided.

In one aspect of the invention, the interface comprises a graphical display operative to provide a visualization of selected historical data on results of an inspection or monitoring process and at least one control or threshold setting wherein an adjustment thereof changes the visualization of the results to reflect the adjustment of the setting.

In another aspect of the invention, the adjustment comprises manipulation of a graphical threshold line on the graphical display, the manipulation triggering re-inspection or re-calculation of the selected historical data and the corresponding re-visualization thereof.

In another aspect of the invention, the adjustment comprises manipulation of graphical elements on the graphical display, the manipulation triggering re-inspection or re-calculation of the selected historical data and the corresponding re-visualization thereof.

In another aspect of the invention, the visualization is operative to trigger additional selected images or data to be displayed upon manipulation of a pointer or graphical actuator.

In another aspect of the invention, the additional selected data includes at least one of time, temperature information, color information, manufacturing path information, mass information, measurement information, identification information, batch information, pressure information, machinery settings information, and maintenance history information.

In another aspect of the invention, the manipulation comprises selecting a bar element of a bar graph to display at least one image correlating to a sample.

In another aspect of the invention, the visualization is operative to display of a subset or superset of the selected historical data upon pointing to or selecting a graphical element.

In another aspect of the invention, the selected historical data represents a population of images obtained during the inspection or monitoring process and the graphical user interface facilitates adjustment of machine vision inspection parameters while simultaneously viewing inspection results on a selected population of images.

In another aspect of the invention, the visualization is a single visualization screen on the display device.

In another aspect of the invention, the adjustment comprises use of sliders, mouse clicking, knobs or touch screens.

In another aspect of the invention, the change of the visualization includes a recalculation for each of the corresponding inspection or process monitoring events to account for the adjustment of the threshold, and further wherein the recalculation is shown in a subsequent visualization.

In another aspect of the invention, the recalculation includes a re-inspection of an image and/or re-analysis of the selected historical data.

In another aspect of the invention, the inspection or monitoring process is an industrial on-line process.

In another aspect of the invention, the visualization of the historical data is a visualization of relevant indicators relating to a measured product or process parameter being monitored.

In another aspect of the invention, the visualization further includes the visualization of at least one selected control limit setting.

In another aspect of the invention, the visualization further includes the concurrent visualization of multiple selected control limit settings.

In another aspect of the invention, the visualization of historical data is a visualization of related or correlated information to respective historical samples.

In another aspect of the invention, the correlated information includes at least one of process controlled machine parts, molds, fixtures, or process elements that effect the process.

In another aspect of the invention, the re-inspection comprises an immediate re-inspection based on at least one setting change on the graphical user interface.

In another aspect of the invention, the historical data includes saved data stored in at least one of a solid-state digital memory, rotating memory, optical memory or other computer storage media.

In another aspect of the invention, the historical data includes images relating to the indicator values of measured product or process parameters shown by the visualization.

In another aspect of the invention, the historical data includes non-image forms of raw sensor data relating to indicator values of the measured product or process parameters shown by the visualization.

In another aspect of the invention, the changes facilitated by the graphical visualization invoke changes in the on-line inspection or process monitoring system.

In another aspect of the invention, the on-line inspection or process monitoring systems includes multiple channels.

In another aspect of the invention, the multiple channels comprise connected, independent inspection or process monitoring stations or nodes.

In another aspect of the invention, the graphical visualization is used for at least one of the following actions: 1) evaluation, 2) making further adjustments, or 3) invoking changes in the inspection or process monitoring system.

In another aspect of the invention, a further action is taken to accept the invoking of the changes.

In another aspect of the invention, a final acceptance of the changes in the inspection or process monitoring system is security protected.

In another aspect of the invention, the visualization comprises a bar graph representing a population of selected historical samples.

In another aspect of the invention, a height of each respective bar is an indicator value of a measure of badness or goodness computed by the system for each respective sample.

In another aspect of the invention, the bar graph includes bar elements having colors which are indicative of a selected characteristic or a display of information relating to the bar elements.

In another aspect of the invention, the selected historical data represents a predetermined sampling of data corresponding to parts or events being inspected or monitored.

In another aspect of the invention, the predetermined sampling comprises at least one of time-based sampling, count-based sampling, periodic sampling, event-based sampling, sampling plan theory based sampling, shift-based sampling, random-based sampling, algorithm-based sampling, military-based sampling, frequency-based sampling, percent-based sampling, location-based sampling, station-based sampling, and manufacturing path based sampling.

In another aspect of the invention, the visualization shows a selected mix of samples from production wherein the selected mix of samples from production represents a comparison of a first type of selected samples with at least a second type of selected samples.

In another aspect of the invention, the first type comprises samples having a particular characteristic.

In another aspect of the invention, the second type comprises samples obtained using at least one of time-based sampling, count-based sampling, periodic sampling, event-based sampling, sampling plan theory based sampling, shift-based sampling, random-based sampling, algorithm-based sampling, military-based sampling, frequency-based sampling, percent-based sampling, location-based sampling, station-based sampling, and manufacturing path based sampling.

In another aspect of the invention, the second type comprises samples having a particular characteristic.

In another aspect of the invention, the visualization results are expressed in terms specifically useful to a user.

In another aspect of the invention, the terms are defined as at least one of dimension, mass, percentage, monetary impact, measurement, visual attribute and numbers of parts.

In another aspect of the invention, a graphical user interface comprises a graphical display operative to provide a visualization of historical data on results of an inspection or monitoring process and at least one threshold setting wherein an adjustment thereof changes the visualization to reflect the adjustment.

In another aspect of the invention, the at least one threshold setting comprises a sensitivity level and a defect scale.

In another aspect of the invention, a method comprises displaying historical data in a graphical user interface to provide a visualization of results of an inspection or monitoring process and changing the visualization to reflect an adjustment of at least one threshold setting.

In another aspect of the invention, a method comprises displaying selected historical data in a graphical user interface to provide a visualization of results of an inspection or monitoring process and changing the visualization of the results to reflect an adjustment of at least one threshold setting.

In another aspect of the invention, a graphical user interface comprises a display operative to provide a single screen visualization of selected historical data on results of an on-line machine vision inspection process, the selected historical data representing a population of inspected parts, and the selected historical data comprising images of selected regions of interest of the inspected parts and selected non-image data; and, at least one threshold setting wherein an adjustment thereof changes the single screen visualization to reflect the adjustment.

In another aspect of the invention, the single screen visualization comprises an unwrapped view of a selected region of interest of a selected image of an inspected part.

In another aspect of the invention, the images comprise a plurality of thumbnail images.

In another aspect of the invention, the visualization includes a holographic image display.

In another aspect of the invention, visualization of specific defect types is in a form of a holographic display.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
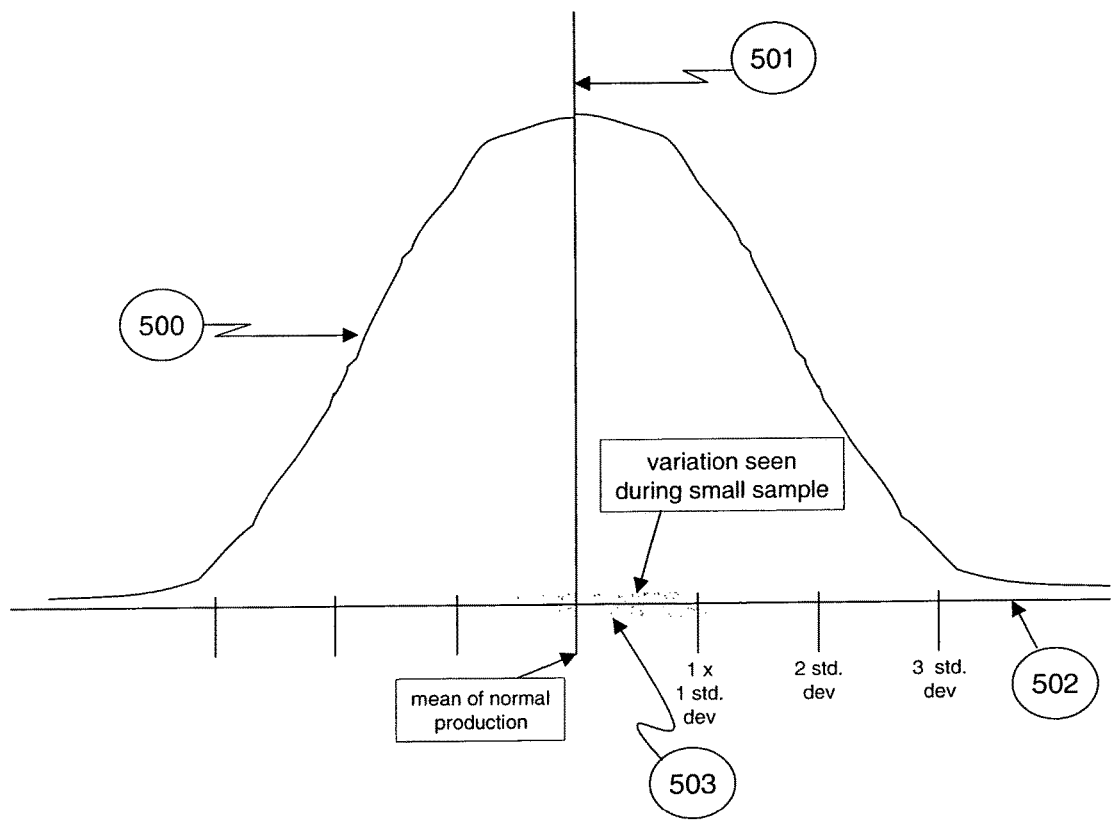
FIG. 1 is a graph illustrating a population of components.

The invention provides for a graphical user interface which provides for very simple and intuitive ways of changing single or multiple monitoring thresholds in a variety of processes such as, for example, an inspection or monitoring process that, in one form, is an on-line process such as an industrial on-line process. The graphical display immediately shows what the monitoring or inspection result would have been if the effected change had been in place during the inspection of the last "N" parts, events or targets. The parts or targets may take a variety of forms. This retrospective graphical "look-back" capability facilitates an estimation of what the future inspection or process monitoring results will be if future production looks similar to the recent past production. This estimation of future inspection results will be more accurate for a process that is in reasonable control and one which has similar randomness in past production as in future production. As it turns out, this type of setting is an excellent technique for a wide range of high production industrial production.

The hindsight look-back graphical interface capability is programmable to be from two to "N" parts. It ideally should be set such that "N" is a substantial enough number to represent a reasonable period of production results. The size of "N" should be selected so that it is representative of a long enough period of production to represent normal, steady state production and have a representative sampling of the usual variations in the process. With production systems that are monitoring the quality of the product with software algorithms that detect anomalies, it is important to see a representative range of the normal variations and randomness that will occur in the production process.

The invention look-back retrospection facilitates changing the set up parameters based on a significant population rather than on a single production component or on a small sample of production components. For example, most machine vision inspection systems are set-up using a methodology which is somewhat trial and error. Typically, one or several images will be taken of a target component and that sample or small sample set will be used to verify the algorithm settings or to define the region of interest (ROI). The ROI may be manually or automatically determined and techniques for doing this are well known in the art. Such techniques as "concentric rings of similar gray shade" have been used on round parts for years. The "judging parameters" will then be set for the chosen region of interest. After making the initial adjustments, more images of product will be snapped and the operator will judge as to whether correct decisions are being made by the inspection system on the basis of the current settings. Whether the defects are being identified according to the wishes of the user is a factor.

If the settings do not seem to be functioning at the correct judging level, then the operator will typically either tighten or loosen the judgment settings and will check the results with yet another sample of images. This process is repeated until the user is satisfied that the setting parameters are at an adequate level to be capable of selecting out bad product while passing good product, e.g. to be able to distinguish between the relative badness and goodness of products.

The major problem with this manual setting loop that is commonly used, is that it does not account for the normal range of process variation that would be seen with a substantially larger sample set. A typical plain color area on a population of normal components might have a gray scale distribution that is represented in FIG. 1 by curve 500. This graph assumes that the X axis (502) is gray scale and the Y axis (501) is number of pixels at the particular gray value within that same region on a population of production parts. While the whole gray scale range under curve 500 might be seen in a substantial population of production, the much more limited range of (503) may be all that is observed on a small population. A small population often requires a higher level of operator experience and training. Even when an experienced set up person uses this methodology for adjusting the parameters, she/he must guess at the true range of normal process variation that is not being represented in the sample set. The bottom line is that the system has a high probability of being set at a less than optimum level until it has been tweaked manually many times.

Equally as important is that a representative range of defects will rarely be present in a small sample set. If an operator is trying to set the system to discriminate between small defects and medium defects, then it is much more desirable for those defects to be visible in the sample set so that the correct discrimination can be verified. With the subject invention, a very large sample set can easily be retroactively tested and the system can be set on the basis of the entire "N" historical sample set population. The results of a quick parameter change can immediately be verified by automatic re-checking of the entire "N" population. This facilitates making settings or changes to the settings with a high level of confidence that the results would have been as desired, and are likely to be in the future production.

The only limitation on sample size of the population is the amount of some form of memory or storage capacity that is available to the inspection or process monitoring system. The storage does not have to be in the actual system but must be available to the system by high-speed access. Certainly the larger the sample size the slower the system will be in responding back with the graphical results. The invention also includes optional data reduction methodologies for reducing the time required to review the large sample set. The data set reduction is important for processing and accessing speed reasons as well. There may actually be multiple points of data reduction in a reduction to practice to facilitate desired re-graphing/re-inspection speeds that are required for a certain application. For example, the flow chart of FIGS. 4 and 5 (to be described in more detail hereinafter) show three different points of data reduction at 405, 408 and 419.

The subject invention fundamentally provides for storing the critical information (e.g. historical information) which is necessary to make a parameter-based judgment about the product or process. At least in one form, this data relates to indicator values of a product or process that is the subject of inspection or monitoring. This data may take a variety of forms including, but not limited to, raw sensor data, image data, or non-image data. This information can be stored as the entire set of original information that was available to the system or it can be stored as an intelligently reduced subset. If the entire historical set of information is stored as it is available to the system, then special data reduction is not required. For example, if it is a machine vision system then all of the images can be saved up to 'N' images. But if it is desirable to save a subset of the original data then decisions must be made as to how to reduce the original data set to a selected set of historical data and yet still facilitate complete review or re-inspection when the look-back capability is invoked.

If it is desirable to save only the critical subset of the original information, there are many ways to reduce the data set. If the data reduction is done correctly, it can not only reduce memory space requirements but can improve access time and ability to sort and access the data.

Figure 2:
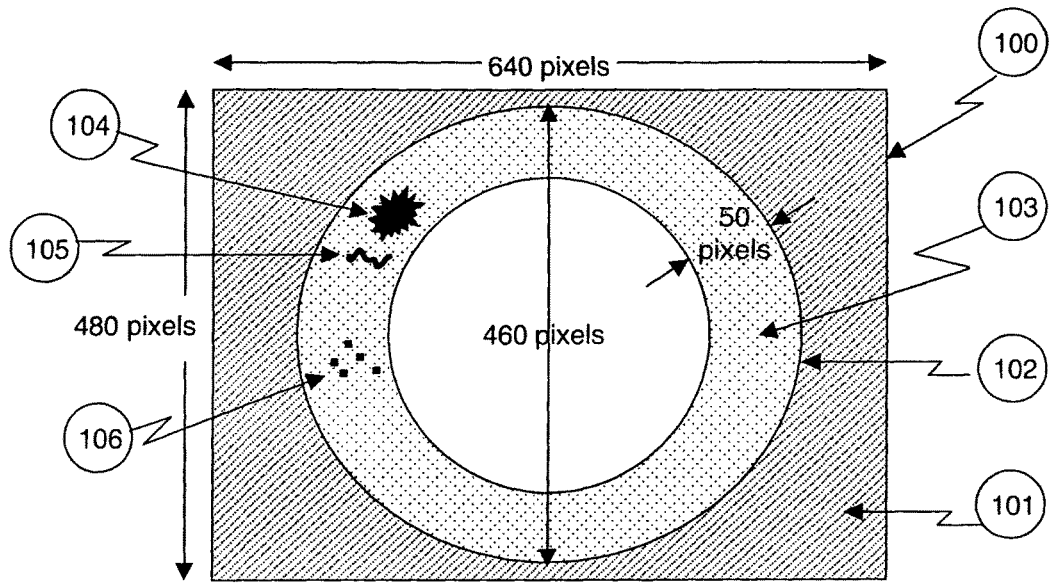
FIG. 2 is a graphic illustration of an image of an inspected component.

If, for example, it is chosen to keep a reduced data set for an image based inspection system, then it would be possible to reduce the data set as follows. If the image of the target component is round, then inherently there are many wasted pixels that are not imaging a portion of the actual target component. FIG. 2 shows such a round target component super imposed in a video frame which has a 4:3 aspect ratio. The shaded areas (101) do not, in this case, represent critical information for evaluating the target component (102). The pixels represented by area (101) do not need to be maintained in order to utilize the (102) target component information at a later time. There are many technologies for data reduction that are well known in the art. It is beyond the scope of this patent to review that wide range of technologies in depth because they are well known in the art. It is simply stated that by using such data reduction or compression technologies to either reduce memory requirements or improve system performance it can be accommodated within the methodology for practicing the subject patent.

Custom techniques for data reduction can be devised for any particular application of the patent. For example, in the machine vision example of FIG. 2, if area 103 represents a region of interest that is being evaluated by the system, then it would be possible to save only critical parameters relevant to region 103. If the system is monitoring for size of defect, then it may well be that the reduced data set need only be the information about the "suspect" defects. The system can then review that information and with a varied sensitivity level, determine which of the defects shall be declared to be a qualifying defect. As shown, the region of interest 103 shows possible defects 104, 105 and 106.

It may well be that saving the entire region of interest (ROI) (103) is enough of a data set reduction to be adequately beneficial and yet allows a more complete look-back review than a more sparse set of data. It should be straight forward for an experienced machine vision engineer to evaluate the algorithm that is being used to interrogate a particular component part or region of interest to determine what the nature of the data set reduction can be to still facilitate a complete look-back inspection.

Another feature of the invention is to facilitate display of a thumbnail of relevant information. In the image based example of FIG. 2, the region of interest (103) could be displayed proximate to the graphical representation. This display could either be in a natural aspect mode or could be in an unwrapped mode so that the toroidal or donut shaped section became a long narrow rectangular section below the graphical results display.

When it is desirable to set the system on a more extended population size, it is reasonable to program the system to utilize samplings that are spaced out in time. Various schemes can be employed which are well known in Statistical Process Control to make sure the samples have been random enough to be representative. For example, the population of "N" parts that the system saves, for use with the invention's graphical user interface optimization, could be 40 different samples of 250 spaced randomly in time over "T" time. This would still yield a population sample size of 10,000, but would arch over any short term trends that might otherwise throw off the look-back projection of future production. It effectively allows for a longer term averaging of the production to facilitate better long-term settings for the future production. Many modifications of this concept will be possible for one skilled in the art. The length of time and randomness settings could be user selectable items in a setup menu and could be hidden from sight from the average user so that it did not confuse or negatively impact the user friendliness of the system.

It is also useful to learn the periodicities of the systems' variations and to automatically determine when the population data should be acquired for best results. Such an automatic scheme could have some sampling that stretches out over a long period of time but with a much heavier weighting on more recent production.

The subject invention encompasses the concept of showing the historical population inspection results graphically. There are many ways that such graphical representation can be reduced to practice. For example, the methods such as those described in connection with FIGS. 4 and 5 may be used. If it is shown as part of a computer display it could be shown on a conventional CRT computer monitor or an LCD monitor, on a plasma or LED monitor, on an organic LED monitor, or could be projected on either a rear or front projection screen, or could be imaged for a viewer on any other kind of computer driven monitor or screen or display device. It is also reasonable to print out the graphical display of the information on either a sheet printer or a continuous roll style printer. Displaying the information on a continuous type printer or a strip chart recorder style of printer would allow a more detailed graphical representation of extremely large population sets.

The graphical interface can be set up in a number of different ways, in terms of actual man to machine interface. While pointing devices are the initial methodology for selection and manipulation, it is easily possible to utilize other technologies as well. In this regard, graphical functionality may be realized through graphical actuators or graphical elements such as sliders, buttons, knobs, areas responsive to mouse manipulation, . . . etc. (as well as similar mechanical implementations). Touch screen will allow an intuitive interface and can be used but has the limitation of requiring large enough 'touch spots' as to not cause incorrect actuation. The granularity is poor with fingers. It has to accommodate left and right handed people and the presence of the hand in front of the screen can dramatically reduce visibility. The 'dragging' function is more difficult with a touch screen and can eventually show wear to the monitor screen. Dirty, greasy or gloved hands can also be a severe detriment from the standpoint of screen visibility, maintenance and longevity. It is nonetheless a popular form of interface and can easily be utilized to implement the invention.

Other forms of man to machine interface are well within the scope of this invention also. PDA's, cell phones, wristwatches and any form of wireless device are anticipated as potential input/output means from the graphical interface. One form of man to machine interface that is anticipated to be a powerful way to implement the invention is just emerging. It involves an intelligent image based system "looking at" an operator and using powerful algorithms to determine where an operator is looking or 'pointing' and/or what motions he may be making that can be interpreted as actions. The graphical display could be imaged or projected in whatever format is most desirable, and then such a system would then be deployed to provide the interface. Since this has been well documented in the art, it is beyond the scope of this invention to further detail it but just to recognize that it would be a powerful technology to chose with which to implement the invention. Similarly, voice commands could be used to implement the invention, either as the primary or as a secondary input/output means.

As a more compact form of showing the graphical representation, it is reasonable to employ various graphical display techniques which display anywhere from all of the data to small summarized subsets of the data. For example, a bar graph can be utilized so that each bar would represent a selected subset (or superset) of the data. As a further example, the height of each bar may be an indicator value of a measure of badness or goodness computed by the system for each respective sample. The bar graph may also include bar elements having colors which are indicative of a selected characteristic or display of information relating to the bar elements. The specific way that it is desirable to see the data depends on the specific application for which the data would be used.

Figure 3:
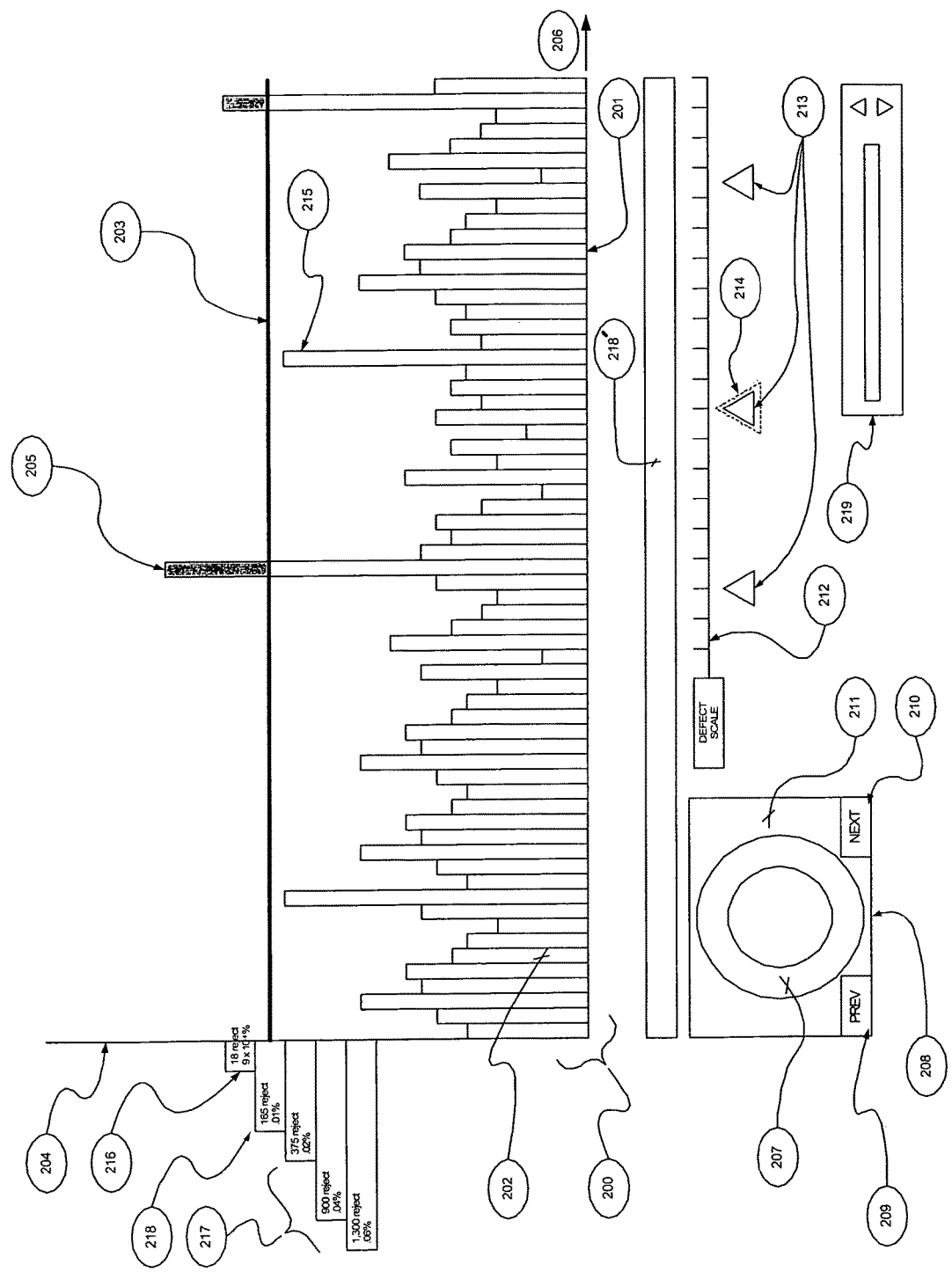
FIG. 3 is an example implementation of the graphical user interface according to the present invention.

FIG. 3 (to be described in more detail hereinafter) shows one example reduction to practice that is advantageous for the automated video inspection of containers for the food and beverage industry. It is useful for inside-of-can inspection processes to be able to make a simple adjustment to the sensitivity setting and see how that would have effected the immediately previous population of cans. Because there are often significant "draw lines" as visual artifacts on the inside of an aluminum or steel can, someone needs to make a subjective judgment as to whether the cans are visually acceptable or not and then transfer that decision to vision system settings. It has cost implications so the better the effects of a change can be understood, the better the manufacturer can make his decision. The cans are currently manufactured by state of the art plants at about 50 cans per second so it does not take long to have a small change reflect large numbers. This invention allows a very intuitive and powerful method for optimizing the inspection set up and understanding the process.

With some types of data, it is adequate to recall only mean and standard deviation for the data during each selected period of time. With other applications, it is far more useful to know the "out-layers" or most egregious measurements or inspections that took place during a particular period of time. With still other sets of data, it is desirable to know in which direction and at what rate the process is trending during a particular period of time so it can be time correlated with related events. The graphical representation could be of a one dimension, two dimension, three dimension or more, style of graph. It would usually be most desirable for one of the dimensions to be a representation of either sequence or time. It is also possible to choose a form factor for the graph that is well known in the science of Statistical Process Control (SPC).

Statistical process control generally is utilized when there is a sample size that is less than 100% of the production. The present invention is contemplated for systems which could be used for less than 100% of the production but are more typically utilized for real time, on-line inspection or process monitoring of 100% of the components or output of a production stream. However, there is no known SPC software package which teaches or facilitates changing the measurement or judging parameters in order to recast or look-back through the historical data to determine what the results would have been under the circumstance of changed parameters. By the very nature of SPC there is usually a sample set of data which is calculated into a running mean (average) and running standard deviation, and there is usually not enough saved information to facilitate a detailed level of re-evaluation on the basis of changed judgment parameters.

Again, it is important to understand the current invention's difference from systems that have been available in the past. Historically, machine vision systems have evaluated a target component on the basis of a fixed set of settings. As each inspection is made it uses those settings to do its evaluation and product is either accepted or rejected on the basis of those numbers and the statistics are collected. If it is determined that the settings are incorrect and need to be adjusted, they can choose to either loosen or tighten the settings on the basis of the current results that they have been getting. There is no assist available to know how the new settings would have reacted if they had been in place during the production of the last "N" products or for any other historical sample size. When the new settings are made there is a mental process that requires experience to intelligently set how much tighter or looser the system should be set. Therefore, each time an adjustment is made it is a trial, error, and observation procedure. The current invention can dramatically simplify the process by allowing the most inexperienced of operators to instantly see visually what the result of his change is likely to be on defects in the future. If it has been observed that a certain type of grease mark has not been detected reliably then the operator has no way of knowing that the changes he is going to make will properly detect the grease mark that they have been passing regularly in their recent production. With the subject invention, the operator has a very intuitive set of tools with which to make the correct evaluation and resetting of the system. If the system has the correct software loaded into it, it is a trivial matter to look back through a number of images for the type of defect with which he is concerned. He can then tune the system to make sure that he is detecting the defect and, just as importantly, that he has not created a circumstance wherein he will be falsely rejecting product that does not have the defect. He can then verify his changes against a very large sample set and make sure it squares with his desires.

Statistical Process Control is a science which gathers measurements about a product or process and then plugs those measurements into a mathematical procedure to evaluate whether the product or process is in or out of control. The measurements may be taken on each product but more typically are taken on a random sampling of products out of a much larger population and then are treated as fixed measurements for future mathematical use. The original part is not maintained in such a fashion that it can be re-measured at a future point. It tends to be good at processes which facilitate definitive measurements. Processes where there is a measurable length or diameter or height is much better suited for Statistical Process Control (SPC). Statistical Process Control does not typically work well where subjective evaluations of product must be made. Subjective evaluations do not have a mathematical number that can be plugged into an equation to arrive at a mean or standard deviation as do more definitive measurements. It is very difficult to put a fixed measurement on a draw line on the inside of a can or the visibility of aluminum grain on a converted end or the blotchiness of a carpet sample. Most statisticians are frustrated by subjective measurements and when attempted have often derived unsatisfactory systems for controlling the processes that make these subjective types of defects. Often they try to measure the process variables which do lend themselves to more definitive measurement rather than tackling the direct evaluation of subjective indicators. It tends to deal effectively with tolerances which can be indicated on a blueprint and then measured in a very objective way.

The subject invention, on the other hand, is specially created as a dramatic improvement to the technology to set such subjective judging systems. Its advantage is the inherent user friendliness and intuitiveness with regard to making inspection and monitoring system settings. A fundamental advantage of the invention is the ability to do "what-if" look-back evaluations (e.g. recalculations and re-analyses of stored data on the images including parts of images or whole images and other data) to know how the inspection results would turn out differently on the basis of changed settings. The ability to do this and make the settings on the basis of a look-back capability for a large population of product allows a substantial improvement in the technology of setting inspection systems. It essentially allows a re-inspection (e.g. an immediate re-inspection) of parts using different (or the same) parameters—without actually re-running the parts or targets through the system.

The subject invention embodies a methodology for graphically representing the historical results of an inspection or process monitoring system. It further facilitates that if a parameter is changed, the results graph can be recast on the basis of the new parameter or parameters changes. It facilitates "what-if" evaluation of the data and then can allow a user to accept the new settings for all inspection or monitoring from that moment forward. If so desired, it then has the ability to show the historical results on the 'N' sized population sample based on either the 'what-if settings or on the actual settings that were present at the time of actual inspection monitoring.

The graphical interface software can be written such that a wide variety of combinations and permutations of these features can be accommodated according to the specific application that is being addressed by the invention. Although the invention is primarily intended to be a graphical representation of the data in one form, it also provides for seeing the actual numbers in a variety of ways. For example, the results data from a particular machine vision inspection system could be shown as a bar graph that compress each 500 inspections into a single indicator bar. Since it is not possible to know by viewing the magnitude of the bar what all the individual measurements were, the software can be written such that by hovering a mouse or trackball pointer over the bar, or clicking on the bar, the desired amount of actual numerical data will be shown. It further facilitates that the data represented by the bar could be expanded so that it can be viewed in more depth. By hovering over the single bar representing 500 inspections, it might be most desirable to indicate the mean of those inspections and the most egregious (maximum indication value) of any one individual inspection. An almost infinite variety of similar schemes can be designed for the creative and intuitive display of the desired critical information. One of the values of this invention is that it provides for an intuitive conversion of data to useful and quickly absorbed information. Armed with this information, a user can then try "what-if" and those settings can either be further optimized or accepted and promulgated as the go forward settings parameters.

Implicit also in the invention is the ability to project the number of products that "would have fallen" outside of the normalcy settings. To the extent that a decision-maker is trying to determine the cost of making the change to the quality settings, the system can project the number of products that, for example, might need to be rejected. By using the projected information, the system could then use various user input standard costs or other information and calculate a cost value as a direct output of the inspection. This direct cost value could be communicated by way of a computer network so that it can be utilized by a larger cost management system. Thus, the system will have used the recent past to project the future in terms of at least one of cost, production rates, scrap, or any other direct or derived estimations.

If the system is so programmed, it can also predict or help predict many useful things with respect to tooling ware, tooling management, preventative maintenance, scheduling, and other manufacturing plant management values. Indicators can be incorporated into the graphical depiction to show the correlation to tooling and process machinery components to dramatically improve plant efficiency and effectiveness. Also, associated numerical values can be incorporated proximate to appropriate graphical elements to provide more functionality for the understanding and troubleshooting of a manufacturing process.

For example, in a display such as FIG. 3, the pre-blow pressure that was used during the forming of a bottle could be superimposed within each bar 202 along the bar graph along with the mold number from which it came. With this incorporation, it is possible to even sort the bar graph such that only the indicator data related to any selected related data would be displayed. Thus, it would be possible to quickly change the judgment settings on the basis of the type of defect or process anomaly that is occurring that is specifically related to a machine part or process parameter.

U.S. Pat. No. 5,591,462 teaches about correlation of defects to particular molds, transfer arms, or other machine parts. It stops short of teaching any method of changing or optimizing inspection settings and it does not in any way teach a look-back or "what-if" technology for re-evaluating on the basis of new setting parameters. The present invention is fundamentally different but can actually be implemented in a way that is a substantial improvement to the '462 patent.

Because any change can immediately be shown graphically, it is possible to design the software of the invention so that it communicates in a way that is understood by the average operator that might be involved with the production line. If designed correctly, the operator does not need to understand the details of the particular monitoring technology that is being graphically summarized because the information is being displayed in a way that he has been taught to intuitively understand. The system can facilitate further explanation in a number of ways that can be easily understood by the operator. The software can be written such that the user can click on, or hover over, various features on the interface screen which can provide a number of forms of further explanation of the graphical representation of the results. This can be in the form of text explanation or if desired, can be in the form of verbal explanation in the operators chosen language. It could also be pictorial or diagrammatic if that is easier for the operator to understand.

The explanation mechanism for the operator can include not just an understanding of the graphical presentation but also can direct the operator as to the correction steps that are recommended. If so programmed, these explanations can be anything from a simple recommendation of correction steps to get the process back on track to detailed step-by-step explanations of corrective or preventative maintenance. These detailed information steps will have to be put into the system by someone who is knowledgeable as to the various process correction steps.

Another aspect of the invention which adds substantially to its usefulness and user friendliness is the fact that it can be programmed so that a single click or single movement on the part of the operator can invoke a change in the graphical representation. For example, in FIG. 3 the sensitivity threshold line 203 can be clicked and then dragged to a greater or a lesser sensitivity setting. If so programmed, the system will then immediately recalculate the graphical depiction of the results based upon the data (202) that the system has stored for such use.

Another aspect of the invention that is quite powerful is it's ability to graphically represent information that helps the user understand what kinds of defects the system is tuned to find. The graphical interface can be designed with a part description pallet that is useful for allowing the user to visually understand the kind of defect that the system is being tuned for. One of the simple forms of defect description is to indicate the defects scale. FIG. 3 shows a defect scale that is a slider which can be set on a continuum from small narrow defects on up to the other end of the scale being large wide defects. It is anticipated that next generations of the product will have a 2-D or 3-D visualization capability so that the operator can select the appearance of the defect to which he wants to tune the system. He would then proceed to set the sensitivity level and the look-back retrospective inspection would take place on the basis of the new changes. Multiple algorithm tunings can take place on a single region of interest so the operator will actually be able to click on a picture of the kind of defect that he would like to find and then quickly tune his system on the basis of the historical sample set and then select the next kind of defect that he would like to find and tune the system on the basis of that appearance of defect and so on. When he has chosen the number of defects that he would like to tune the system for and has adjusted his sensitivity level to each of those types of defects the system would then draw a visualization map and indicate which of the defects are chosen for tuning and at what sensitivity level. There would be many ways to image this but it is anticipated that it could either be of a 3-D graphical nature or it could be visualized as a 3-D translucent box containing the defects in different locations within the box. Future generations of the product it is anticipated will likely use holograms to create a 3-D imaged set of the defect types for which the system will be tuned. This capability will allow the invention to incorporate classification and categorization in combination with the tremendous advantages of the look-back re-inspection capability that allows the system to be set up properly. The more easily the system allows the operator to intuitively tune it for particular kinds of defects and classes of defects the more powerful the invention can be.

FIG. 2 shows different types of defects 104, 105, 106 that the system could depict graphically or with visualization. If it is desirable to find small high contrast dots 106 but ignore longer skinny defects 105, then the system will facilitate doing so in an intuitive way that is easy to understand and requires little training. Also if a defect 106 is large with a lot of surface real estate but is very low in contrast, it would be easy to specify the visual attributes by way of the graphical interface. The different defect types would cause the inspection system to output proportional indicator values which would be highest when the exact attributes for which the inspection software has been set to look for. These machine vision algorithms are well known in the field and are at the discretion of the machine vision software engineer.

Similar capabilities can be invoked for signature-based systems wherein characteristic portions of signature or waveform which represents features on the part. These signatures have characteristic shapes, slopes, mathematical relationships and other unique information that can be identified for tuning the system's searches. They can be graphically represented for friendliness in setup and to facilitate look-back re-examination.

The graphical display and interface can use any form of manipulation such as clicking, clicking and dragging, double clicking, text or numerical entry into a dialogue box, clicking up and down arrow keys, "radio knobs", or 'slider' adjustments. The whole range of Microsoft Windows, Apple Macintosh, Visual Basic or other visual interface screen software can be utilized to implement the invention. Current best practices software and user interface technology can be utilized in whatever combination or permutations would be most desirable for the application implementation.

One of the issues that industry has wrestled with for a very long time is trace-ability and track-ability of previously manufactured products. Since the current invention can connect related data and information to each individual inspection, it is possible to have a very complete file on each and every part that is manufactured through an inspected production line. To the extent that serial numbers or RFIDs (Radio Frequency Identification tags) or other positive part identification is available in the part record, it is possible to re-inspect the parts at a later date and verify which parts are the ones of true concern. For example, if an air bag or cluster bomb igniter or other critical component was inspected originally but the system was not tuned to find the particular kind of defect that is now of concern, then the appropriate re-settings of the system could quickly re-inspect all the old parts and could identify the specific components which should be subject to recall. This type of look-back capability could have the programmability to facilitate sorting for what dates, production lots, serial number ranges, or other the re-inspection takes place. The look-back retrospective capability can also facilitate a reduction in insurance costs or a reduction in liability related issues. A look-back re-inspection capability can also incorporate new algorithms to review historical product to ferret out defects that perhaps the older algorithm was incapable of.

The invention contemplates storing extremely large sample sets of images or inspection indicators or other data relevant to the inspection and could easily keep 100% of all the production over an extended period of time. This would facilitate a number of look-back re-inspection capabilities that could be very useful for some manufacturers. It could in fact be a complete 100% digital documentation of their historical production while allowing quick re-inspection or re-review of the products. The system could then allow the re-inspection review pursuant to a lawsuit to verify the actual condition of product at time of manufacture.

There are also many circumstances that occur in plants which cannot easily be or can never be reproduced. For example, moisture that is on products that later dries or evaporates, coatings that are later cured and become clear and a wide variety or combinations of circumstances that occur simultaneously without the knowledge of the production personnel. By subsequent re-tuning of the system and invoking re-inspection the cause of a problem could be more easily identified.

The invention also contemplates making it much easier to verify new, developmental, or experimental inspection algorithms. To the extent that a very large population data base can be re-inspected with the new algorithm it can make it much more straight forward to verify the full functioning of the algorithm and compare it to the original algorithms that may have been used at the actual time of production.

It is further contemplated that systems can be interconnected in such a way that a single graphical look-back interface can be invoked to drive the re-inspection throughout an interconnected system of cameras or inspection systems. Such a hook up could link any number of smart cameras, vision systems, other inspection systems or process monitoring systems together such that the large historical data base population could either be accumulated at each device or at nodes between devices or at a central repository. Adequate band width would be required if full data is to be sent to more centralized locations but it could eliminate the need to have extensive memory at the remote or satellite locations. By having a look-back inspection interface capability interconnected it is possible to monitor whole production lines or whole plants with the capability. This could then work in conjunction with a plant-wide production monitoring system or could be substitutional for such a system, depending on the application and performance needs.

If two or more systems are inter-linked together then they could facilitate calibration and standardization and similar performance among the interconnected number of similar systems. As more and more companies are seeking extremely high quality levels this could be a valuable tool to make it easier to attain such goals.

It should be understood that there are many more ways in which a look-back retrospective inspection system can be used throughout the manufacturing world. This invention contemplates the whole range of capabilities and uses incorporating the various mentioned features in all of their combinations and permutations into systems that are appropriate for any particular application. One skilled in the art of automated inspection and graphical user interfaces will readily understand many more ways that this technology can be applied to specific applications to great advantage and should in no way be limited to the specific examples cited here.

The application mentioned earlier, which is the on-line inspection of food and beverage containers, is described in detail here. Because there is often a substantial amount of subjective judging of the various quality aspects regarding the inside of a beverage container, the graphical user interface of FIG. 3 provides a graphical display operative to provide a visualization of selected historical data on results of an inspection or monitoring process and at least one control or threshold setting wherein an adjustment thereof changes the visualization of the results to reflect the adjustment of the setting. In one example, the at least one threshold setting comprises a sensitivity level and a defect scale. This system provides a substantial improvement to the vision inspection system over currently available systems.

The bar graph 200 shows the inspection results in one of multiple modes. For detailed set up, it shows a single part mode which provides a powerful way of understanding how the underlying algorithm is inspecting on the basis of a specific kind of defect or on an individual part. The subject invention is invoked through the pull down menu 219 which allows the user to select the single part mode or the last one hundred parts mode or the last "N" mode. The value for "N" can be set to any number, but 10,000 is used for this example application. In the last one hundred parts mode, each bar represents the strongest indicator value resulting from the vision inspection of each individual part of the last one hundred. The higher the vertical amplitude of the bar, the worse that indicator value judges the individual component to be on the basis of the current settings. Parts that have a bar that exceeds the location of the threshold line 203 are judged to be faulty like bar/part 205. Note that 215 is below the threshold line and is deemed to be of acceptable quality with the currently shown scan. On this version of the graphical user interface there are two settings upon which the system is judging at the graphical user interface level. They are defect scale 212 and sensitivity level 203. These two settings can be easily changed by the operator and upon making a change will be instantly re-visualized so they can be understood through the visual aspects of the graph. These adjustments can be realized through manipulation of graphical elements on the display or through manipulation of a threshold line, such as threshold line 203. The vertical bars that exceed line 203, like 205, are turned red (not shown) instead of the normal green color (not shown) of the bars 202 that do not exceed line 203. The "Y" axis or vertical axis of the graph 204 represents sensitivity. In one form, for example, sensitivity may relate to grey scale data. The "X" axis 201 represents individual parts in a time sequence with forward time moving in the direction of 206. Two variables were chosen for this graphical display to maximize ease of use but more could be incorporated if the application dictates. The user adjustable parameter settings on this graphical interface are the defects scale 212 and the sensitivity bar 203. Of course, if more adjustable parameters are desired, additional scales could be incorporated into the display or screen, for example. In order to change the sensitivity adjustment 203, the user would click and hold his pointing device on line 203 and drag it up or down depending on which way he wants to go with the sensitivity adjustment. By moving the line down he increases the number of bars that exceed the height location of 203 and, thus, increases the sensitivity of the inspection. As line 203 is dragged upwardly it decreases the number of bars that would exceed its height threshold and, thus, reduces the sensitivity of the system. For example, the threshold line 203 is higher than the bar 215 and, therefore, the part represented by bar 215 is deemed to be passable. Its bar would be imaged as green representing its status. The second adjustment is the defect scale adjustment 212 (which, in one form, may represent the size of defects, for example). The algorithm being graphically represented by FIG. 3 has the ability to have multiple scale settings, each with its own sensitivity bar 203 and the defect scale settings 213 are indicated by their position along the defect scale line 212. Since there are multiple defect scale settings 212 based on a single region of interest (ROI), the center defect scale indicator 214 is double surrounded for strong visual indication as to which algorithm is being displayed currently. By clicking on the defect scale indicator 213 that is of interest, it will be highlighted like 214 and the graphical display 200 will instantly change to reflect the inspection results according to the defect scale indicator 213 that was clicked. The user then clicks and drags the defect scale indicator 214 that has been highlighted until the desired setting has been determined. He can then choose to re-adjust the sensitivity level line 203 to suit the new defect scale setting that he has chosen. As the two setting adjustments are changed, the graphical interface quickly changes to reflect the new settings. As the new bars are displayed, there are also numerical outputs 217 that are displayed. The "Y" axis location 204 of the numerical outputs 217 are anticipatory of the number of rejects that would be attained if the sensitivity threshold line 203 were moved to the center of the box 217 wherein the numerical reject prediction is written. Thus, if the user were to move the threshold sensitivity line 203 from the center of the current box 218, indicating 165 rejects, down to a position centered in the next box down 217, indicating 375 rejects, by referencing the boxes 217, 218, 216, the operator is able to predict the number of defects that would occur on the basis of making a setting of the sensitivity threshold line 203 that is proximate to the center of each box. The numerical read outs are recalculated quickly when a change to the defect scale 212 is made or when the sensitivity threshold line 203 is changed.

Also, part of the graphical user interface is a "thumbnail" video image box 208 which contains a sample image, or a plurality of thumbnail-type images. This may also be considered to be a part of the graphical display, such as graphical display 200. The sample image 207 is the image whose inspection results corresponds to one of the bars 202 in the bar graph 200. If the user wants to see the actual image represented by the bar 215, he can click on bar 215 and the corresponding image will be shown in box 208 as image 207. So the operator can click on, or select, any of the bars 202 to bring up a particular image represented by the bar. Also, when one of the bars 202 is clicked and held, this may serve as a trigger to display additional or related or correlated information such as an image or data. For example, a dialog box pops up that contains further details about that particular part and other desired directly related information corresponding to that part. It could, for example, show actual numerical values that were found during the inspection and it could relate from what body maker machine it came. It could relate to machine parts, molds, fixtures or process elements that impact the process and relate to the part or piece of historical data that is of interest. It could further detail time of day, pressure required for forming or even a part serial number when the software is written to coordinate and save the information. As a further example, the additional selected data may include at least one of temperature information, color information, manufacturing path information, mass information, measurement information, identification information, batch information, other pressure information, machinery settings information, and maintenance history information. An alternate way to scroll through the images is to use the next and previous buttons 210 and 209 which will successively present the different images and will simultaneously highlight the graphic bar 202 that corresponds to that image. For each image that is brought up in box 208 as a sample image 207, an unwrapped region of interest stripe (ROI) will appear in the video thumbnail box 218'. The video thumbnail unwrapped section 218 is quite useful when set to the single part mode or a multi-part look-back mode in the pull down menu 219. It is also useful in the last hundred-part mode or last "N" mode for helping to understand the analysis according to many of the advantages of the present invention.

For purposes of getting a much more accurate prediction of the future inspection results by way of the past inspections, the operator can choose from the pull down menu 219 a selection of the last "N" parts. For a typical can industry application, it would be desirable to have "N" set to at least 10,000 parts. Although this seems like a large population on which to set the system, because of the extremely high speeds it is only about 3 to 6 minutes of actual production.

Although the display of FIG. 3 serves as an example, it may well be modified to accommodate visualization of a selected mix of data having different characteristics, for example, in a split screen. One type of data may be based on samples obtained from production, while another type of data may be based on a sampling of defective parts. In any case, the visualization, in at least one form, is expressed in terms specifically useful to a user. In this regard, for example, it may be expressed in terms of dimension, mass, percentage, monetary impact, measurement, visual attribute or number of parts.

Although these parameters serve as an example, it is contemplated that software will be written to support much larger historical look-back sample sets with more correlated data joined to the record of each individual sample. Of course, less sample sets may also be desired for a particular application.

An important benefit of the system is certainly the ability to do a fast look-back to facilitate what settings provide the right compromise between too much scrap and unacceptable quality levels. By utilizing the features of this graphical user interface, which in one form comprises a single visualization screen on the display device, even a novice user can quickly become more proficient at setting the system than a more proficient user of other systems that utilize the traditionally available setting methods. In addition, if so desired, adjustment of the machine vision system may be realized virtually simultaneously. Further, the invention may be implemented where multiple channels are used or where multiple nodes or stations of a system are implemented.

Figure 4:
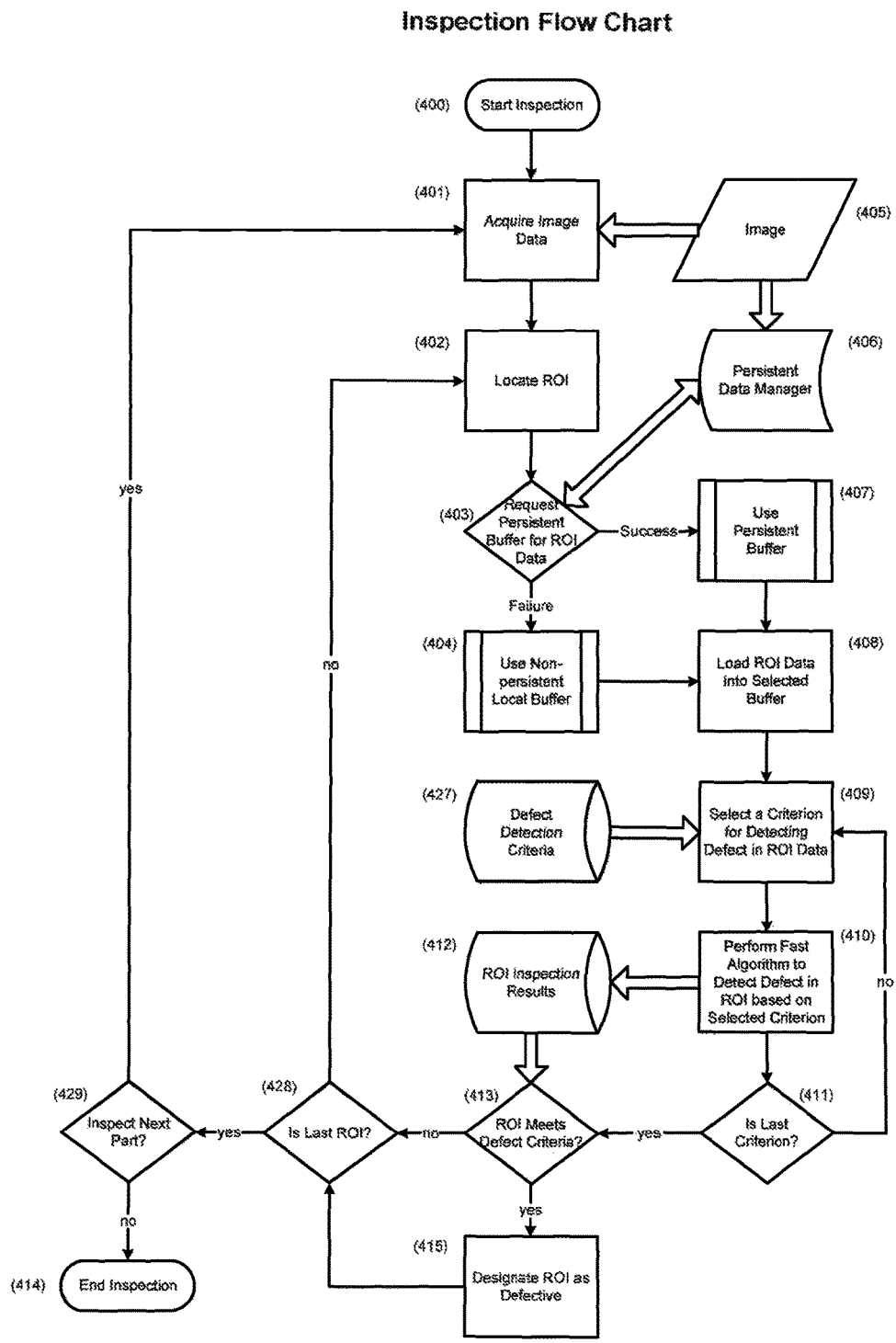
FIG. 4 is a flow chart representing a method according to the present invention; and, FIG. 5 is a flow chart representing a method according to the present invention.
Figure 5:
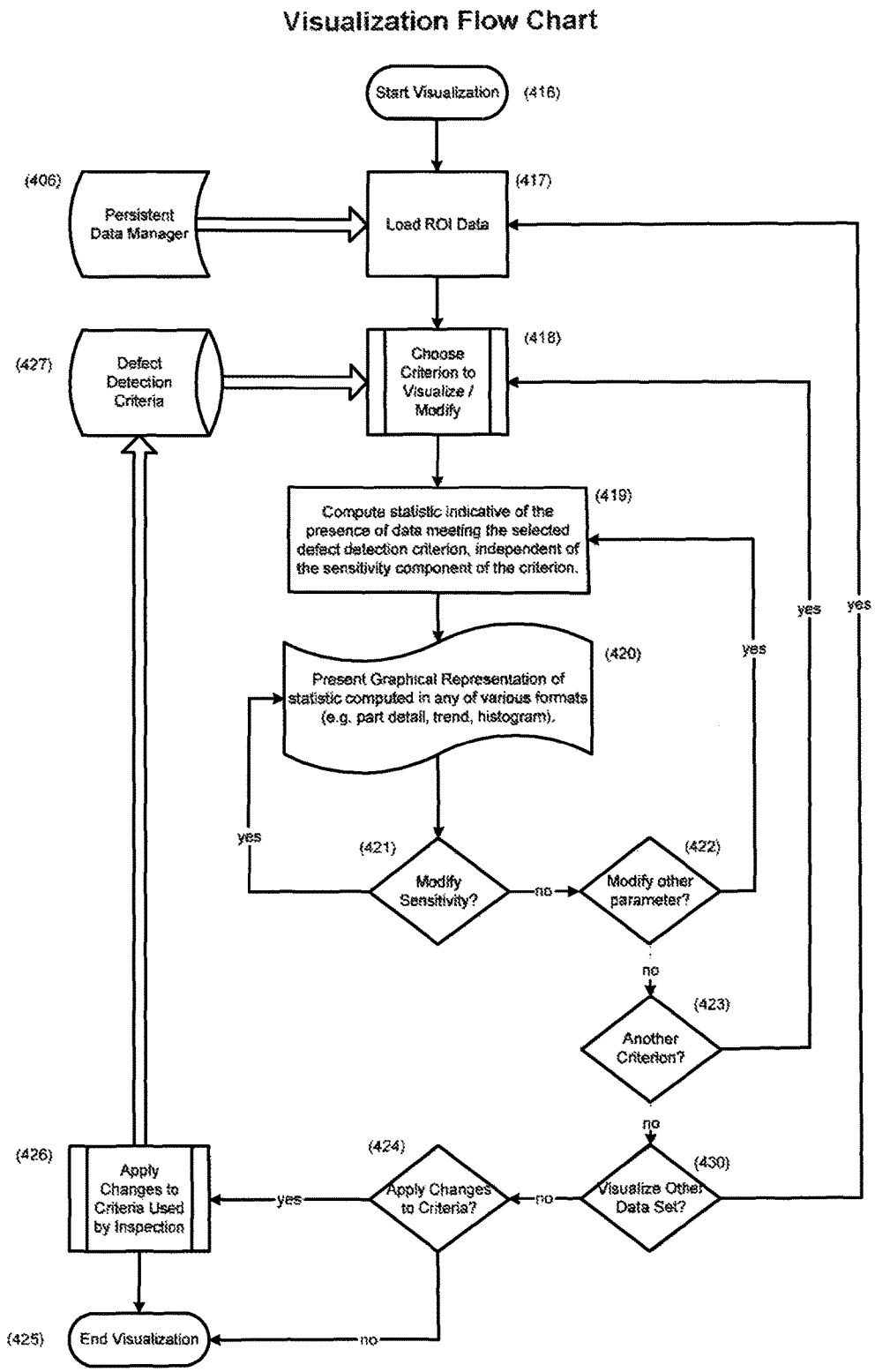

To further explain the system and methods of the present invention, reference is made to FIGS. 4 and 5. It should be appreciated that the methods illustrated in FIGS. 4 and 5 are but one example of an implementation of the present invention, e.g. in a machine vision article inspection environment. It should be appreciated, as noted herein, that other implementations may also be realized. Further, it should be understood that these methods may be implemented in a variety of manners. For example, the methods may be incorporated into software routines or modules that are suitably stored and accessed within the control system, such as the controller or processor of a machine vision system. The software may be resident in an appropriate read only memory or the like, or it may be suitably distributed throughout the system and its components. A variety of software techniques, and corresponding hardware configurations, may be used in the environment in which the invention is used. These will be apparent to those skilled in the art upon a reading of the present application.

With reference now to FIG. 4, an inspection process supporting an implementation of the present invention is illustrated. As shown, the inspection process is initiated as is known in the art (at 400). Image data is then acquired (at 401) from an image inspection (405). The images relate to parts that are to be inspected, as is known. This may be accomplished using a camera, or other appropriate sensing device. A region of interest of the parts, such as region 103 (FIG. 2), is identified (at 402). Oftentimes, for reasons the will be apparent to those of skill in the art, a region of interest is a sub-portion of an image, but it may also be the entire image. This location of the region of interest is accomplished through techniques that are well known in the art of machine vision inspection. A request is then made for a persistent buffer for the data for the region of interest (at 403). The persistent buffer may take a variety of forms but, in one form, is a buffer that will withstand power outages, system failures and the like. In this regard, the persistent buffer may take the form of a non-volatile memory module. A persistent data manager is used in this regard (at 406). The persistent data buffer will suitably locate and make available a persistent buffer. It may also be operative to manage data therein. If a persistent data buffer is available, it is used (at 407). If a persistent data buffer is not available, a non-persistent local buffer is used (at 404). In either case, region of interest data is loaded into the selected buffer (at 408).

Next, a criteria is selected by which to detect defects in the region of interest (at 409). Again, this process is well known in the machine vision field. These criteria are stored and may be accessed as shown (at 427). An algorithm is then typically run in accord therewith to detect defects (at 410). This algorithm or routine that is performed on the parts being inspected in manners that are typical in the machine vision or process control fields. In one machine vision application the algorithm or routine is run to identify parts having defects. Notably, the results are stored in a suitable memory (at 412). As will be apparent from the description below, this storage will be accessed during implementation of the graphical user interface contemplated herein. As will be appreciated, storage of data, including images and non-image data representing the results of the inspection (or monitoring) process, may be selective in nature as a result of the current practical limits on data storage hardware and software. So, while all data may be stored, it may also be desired to store only a sampling of data, or a reduction of the data. In this regard, at least one of time-based sampling, count-based sampling, periodic sampling, event-based sampling, sampling plan theory based sampling, shift-based sampling, random-based sampling, algorithm-based sampling, military-based sampling, frequency-based sampling, percent-based sampling, location-based sampling, station-based sampling, and manufacturing path based sampling may be used. As above, SPC may also be used. As above, reducing the data set may mean storing only a region of interest of an image or storing less than all images. Of course, it should also be understood that supplemental data storage techniques and hardware may be implemented, as compared to a traditional machine vision system, to accommodate the storage of the data. Along these lines, for example, a solid state digital memory, a rotating memory, an optical memory, or other computer storage device may be used. A determination is then made as to whether the last criterion has been used (at 411). If so, a determination is made as to whether the region of interest meets the defect criteria (at 413). If so, the region of interest, e.g. the part, is determined to be defective (at 415). A determination is then made as to whether the region of interest is the last region of interest to be inspected (at 428). If not, a new region of interest is located (at 402) and steps are repeated. If the last region of interest has been inspected, a determination as to whether the last part has been inspected is made (at 429). If not, another image is acquired (at 401) and steps are repeated. If the last part in the process has been inspected, the inspection is ended (at 414).

As will be understood, as the inspection process is run on a given batch of parts, the data on the regions of interest inspection results is stored as noted above. This, of course, coincides with the region of interest data that is stored. It will be understood that the process of inspecting and obtaining data may require varying amounts of time to complete. The time period used depends on the objectives of the user, the efficiency of the process, . . . etc.

With reference now to FIG. 5, use of the region of interest inspection results will become apparent. In this regard, a visualization process according to the present invention is initiated (at 416). Region of interest data is then loaded (at 417). In this regard, the persistent data manager is used (at 406). For example, the data manager may retrieve the relevant data from the storage location where the data was stored during inspection, as described above. Next, a criterion is selected to visualize and/or modify (at 418). These criteria may take a variety of forms as contemplated herein. For example, the criteria may be grey scale characteristics and/or the size of the defects. Any criteria used in the machine vision or process control fields would suffice, as well as others. Again, these are stored (at 427). Statistics are then computed that are indicative of the data meeting the criteria (at 419). This amounts to a re-inspection of the images of the parts that were previously inspected, without actually running the parts back through the system. The routines for accomplishing this are the routines that are well known to those in the field. It is possible to "re-inspect" the parts because the raw data on the previous inspection of the parts is stored, as noted above. The data simply is re-analyzed and results are re-calculated for the selected criteria or change of settings. Of course, this computation may be accomplished independent of the sensitivity component of the criteria and may be done so in a variety of well known manners. A graphical representation of the computed statistics is presented (at 420). This may include the re-calculation of data considering the sensitivity. It should be appreciated that the steps at 419 and 420 may be implemented as separate steps as shown, or could be implemented as a single recalculation and visualization step. A determination is them made as to whether the user is modifying the sensitivity, such as by adjusting a threshold line on the graphical display, for example (at 421). If so, the graphical representation is so modified (at 420). Of course, a re-calculation of data and re-visualization will occur. If no modification is desired, a determination is made as to whether another parameter is to be modified (at 422). If so, the parameter is used to recompute the statistics (at 419), and steps are repeated. If no modification of any parameter is desired, a determination is made as to whether another criteria should be selected for visualization or modification (at 423). If so, another criteria is selected (at 418), and steps are repeated. If not, a determination is made as to whether another data set is to be visualized (at 430). If so, additional region of interest data is loaded (at 417), and steps are repeated. If no other data set is desired, however, a determination is made as to whether changes should be applied to the criteria used in the inspection process (at 424). If not, the visualization process is ended (at 425). If, however, a decision is made to implement changes in the inspection criteria, such changes are made (at 426). Of course, such criteria data is updated (at 427).

As should be apparent from the flowcharts of FIGS. 4 and 5 and from the present disclosure, the user of the graphical user interface contemplated herein has flexibility during the use of the process. For example, once the user can see the visualization created by the system and modify it, as described, he/she may evaluate the visualization and the underlying data, make further adjustments to create further visualizations (and, consequently, further recalculations and re-analyses), or invoke changes to the inspection or monitoring system based on the adjustments made to the visualization. In one form, the system may require intermediate steps and final acceptance of any changes that may be invoked to the inspection or monitoring system. Any such final acceptance may be security enabled or protected. The techniques involved in invoking the changes to the underlying inspection or monitoring system will apparent to those in the field.

The preceding reduction to practice details one way that the invention can be practiced. One skilled in the arts of automated inspection and graphical user interfaces will be able to apply the disclosed teachings in many different ways to cover an enormous range encompassed by the different forms and applications of automated inspection or automated process monitoring systems.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

The invention claimed is:

1. A system for use with a machine vision inspection system, the system comprising:
 a graphical display device operative to provide a visualization of selected historical data on results of a machine vision inspection process, the selected historical data being stored in a storage device and including image data including images obtained and stored during the inspection process, wherein the visualization comprises a representation of a population of selected images, an indicator value of a measure of acceptability for each respective image and a corresponding element providing for selection and viewing of an inspected image of each respective sample; and,
 a controller for the inspection process having at least one threshold setting for a parameter of the inspection process, wherein an adjustment thereof comprises user manipulation of a graphical element and triggers re-inspection of the stored images within the selected historical data and changes the visualization of the results to indicate differing results of the inspection process based on the adjustment of the setting.

2. The system as set forth in claim 1 wherein the visualization is operative to trigger additional selected images or data to be displayed upon manipulation of a pointer or graphical actuator.

3. The system as set forth in claim 2 wherein additional selected data includes at least one of time, temperature information, color information, manufacturing path information, mass information, measurement information, identification information, batch information, pressure information, machinery settings information, and maintenance history information.

4. The system as set forth in claim 1 wherein the selection of the element comprises selecting a bar element of a bar graph to display at least one inspected image of a sample.

5. The system as set forth in claim 1 wherein the visualization is operative to display of a subset or superset of the selected historical data upon pointing to or selecting a graphical element.

6. The system as set forth in claim 1 wherein the selected historical data represents the population of images obtained during the inspection process and the system facilitates adjustment of machine vision inspection parameters while simultaneously viewing inspection results on a selected population of images.

7. The system as set forth in claim 6 wherein the visualization is a single visualization screen on the display device.

8. The system as set forth in claim 1 wherein the adjustment comprises use of sliders, mouse clicking, knobs or touch screens.

9. The system as set forth in claim 1 wherein the reinspection is shown in a subsequent visualization.

10. The system as set forth in claim 9 wherein the reinspection includes a re-calculation of sensor data and non-image data.

11. The system as set forth in claim 10 wherein the re-inspection comprises an immediate re-inspection based on at least one setting change on the graphical user interface.

12. The system as set forth in claim 1 wherein the inspection or monitoring process is an industrial on-line process.

13. The system as set forth in claim 12 wherein the changes facilitated by the graphical visualization invoke changes in the on-line inspection or process monitoring system.

14. The system as set forth in claim 13 wherein the on-line inspection or process monitoring systems includes multiple channels.

15. The system as set forth in claim 14 wherein the multiple channels comprise connected, independent inspection or process monitoring stations or nodes.

16. The system as set forth in claim 12 wherein the graphical visualization is used for at least one of the following actions: 1) evaluation, 2) making further adjustments, or 3) invoking changes in the inspection or process monitoring system.

17. The system as set forth in claim 16 wherein a further action is taken to accept the invoking of the changes.

18. The system as set forth in claim 17 wherein a final acceptance of the changes in the inspection system is security protected.

19. The system as set forth in claim 12 wherein the visualization of the historical data is a visualization of relevant indicators relating to a measured product or process parameter being monitored.

20. The system as set forth in claim 19 wherein the visualization further includes the concurrent visualization of multiple selected control limit settings.

21. The system as set forth in claim 19 wherein the visualization of historical data is a visualization of related or correlated information to respective historical samples.

22. The system as set forth in claim 21 wherein the correlated information includes at least one of process controlled machine parts, molds, fixtures, or process elements that effect the process.

23. The system as set forth in claim 19 wherein the visualization further includes the visualization of at least one selected control limit setting.

24. The system as set forth in claim 1 wherein the historical data includes saved data stored in at least one of a solid-state digital memory, rotating memory, optical memory or other computer storage media.

25. The system as set forth in claim 24 wherein the historical data includes non-image forms of raw sensor data relating to indicator values of the measured product or process parameters shown by the visualization.

26. The system as set forth in claim 1 wherein the visualization comprises a bar graph representing a population of selected historical samples.

27. The system as set forth in claim 26 wherein a height of each respective bar is an indicator value of a measure of badness or goodness computed by the system for each respective sample.

28. The system as set forth in claim 26 wherein the bar graph includes bar elements having colors which are indicative of a selected characteristic or a display of information relating to the bar elements.

29. The system as set forth in claim 1 wherein the selected historical data represents a predetermined sampling of data corresponding to parts or events being inspected or monitored.

30. The system as set forth in claim 29 wherein the predetermined sampling comprises at least one of time-based sampling, count-based sampling, periodic sampling, event-based sampling, sampling plan theory based sampling, shift-based sampling, random-based sampling, algorithm-based sampling, military-based sampling, frequency-based sampling, percent-based sampling, location-based sampling, station-based sampling, and manufacturing path based sampling.

31. The system as set forth in claim 1 wherein the visualization shows a selected mix of samples from production wherein the selected mix of samples from production represents a comparison of a first type of selected samples with at least a second type of selected samples.

32. The system as set forth in claim 31 wherein the first type comprises samples having a particular characteristic.

33. The system as set forth in claim 31 wherein the second type comprises samples obtained using at least one of time-based sampling, count-based sampling, periodic sampling, event-based sampling, sampling plan theory based sampling, shift-based sampling, random-based sampling, algorithm-based sampling, military-based sampling, frequency-based sampling, percent-based sampling, location-based sampling, station-based sampling, and manufacturing path based sampling.

34. The system as set forth in claim 31 wherein the second type comprises samples having a particular characteristic.

35. The system as set forth in claim 1 wherein the visualization results are expressed in terms specifically useful to a user.

36. The system as set forth in claim 35 wherein the terms are defined as at least one of dimension, mass, percentage, monetary impact, measurement, visual attribute and numbers of parts.

37. The system as set forth in claim 1 wherein the at least one threshold setting comprises a sensitivity level and a defect scale.

38. The system as set forth in claim 1 wherein the visualization includes a holographic image display.

39. The system as set forth in claim 1 wherein visualization of specific defect types is in a form of a holographic display.

40. A system comprising:
a graphical display device operative to provide a visualization of historical data on results of a machine vision inspection process, the historical data being stored in a storage device and including image data including images obtained and stored during the inspection process, wherein the visualization comprises a bar graph representing a population of selected images, wherein a height of each respective bar is an indicator value of a measure of goodness or badness computed for each image and wherein each respective bar is selectable to view an inspected image; and,
a controller for the inspection process having at least one threshold setting for a parameter of the inspection process wherein an adjustment thereof comprises user manipulation of a graphical threshold on the graphical display device and triggers re-inspection of the stored images of the historical data, changes the visualization to indicate differing results of the inspection process to reflect the adjustment, and selectively changes parameters of the inspection or monitoring process.

41. A method comprising:

displaying historical data in a graphical user interface on a graphical display device to provide a visualization of results of an inspection process, wherein the visualization comprises a representation of a population of selected images obtained and stored during the inspection process, an indicator value of a measure of acceptability for each image and a corresponding element providing for selection and viewing of an inspected image; and, changing, by a controller, the visualization to indicate differing results of the inspection process to reflect a re-inspection of the images obtained during the inspection process, triggered by an adjustment of at least one threshold setting for a parameter of the inspection process through user manipulation of a graphical element of the graphical user interface on the graphical display device.

42. A method used in a process or monitoring system, the method comprising:

displaying selected historical data in a graphical user interface on a graphical display device to provide a visualization of results of an inspection process, wherein the visualization comprises a bar graph representing a population of selected images, wherein a height of each respective bar is an indicator value of a measure of goodness or badness computed for each image and wherein each respective bar is selectable to view an inspected image; and, changing, by a controller, the visualization to indicate differing results of the inspection or monitoring process to reflect a re-inspection of the images obtained during the inspection process, triggered by an adjustment of at least one threshold setting for a parameter of the inspection process through user manipulation of a graphical element of the graphical user interface on the graphical display device.

43. A system for use in a machine vision inspection system, the system comprising:

a display device operative to provide a single screen visualization of selected historical data on results of an on-line machine vision inspection process stored in a storage device, the selected historical data representing a population of inspected parts, and the selected historical data comprising images of selected regions of interest of the inspected parts obtained and stored during the inspection process, wherein the visualization comprises a bar graph representing a population of selected images, wherein a height of each respective bar is an indicator value of a measure of goodness or badness computed for each image and wherein each respective bar is selectable to view an inspected image; and, a controller for the on-line machine vision inspection process having at least one threshold setting for a parameter of the inspection process wherein an adjustment thereof comprises manipulation of a graphical threshold line or graphical element on the graphical display device and triggers re-inspection of the images and changes the single screen visualization and indicates differing results of the process to reflect the adjustment.

44. The system as set forth in claim 43 wherein the single screen visualization comprises an unwrapped view of a selected region of interest of a selected image of an inspected part.

45. The system as set forth in claim 43 wherein the images comprise a plurality of thumbnail images.

* * * * *